United States Patent

Düll et al.

[11] 3,994,236
[45] Nov. 30, 1976

[54] SWITCH FOR MAGNETIC SUSPENSION RAILROAD

[75] Inventors: Hans-Jürgen Düll, Langensendelbach; Heinz Wiechens, Erlangen, both of Germany

[73] Assignee: Siemens Aktiengesellschaft, Munich, Germany

[22] Filed: May 15, 1975

[21] Appl. No.: 577,920

[30] Foreign Application Priority Data
May 27, 1974 Germany............................ 2425507

[52] U.S. Cl. ........................... 104/130; 104/148 MS
[51] Int. Cl.² ........................................ E01B 25/06
[58] Field of Search ........ 104/130, 148 MS, 148 SS, 104/148 LM, 134; 335/216; 310/13

[56] References Cited
UNITED STATES PATENTS

| | | | |
|---|---|---|---|
| 3,470,828 | 10/1969 | Powell, Jr. et al. .............. | 335/216 X |
| 3,763,788 | 10/1973 | Pougue ........................ | 104/148 LM |
| 3,850,109 | 11/1974 | Thornton ...................... | 104/148 SS |
| 3,858,521 | 1/1975 | Atherton ...................... | 104/148 SS |
| 3,861,320 | 1/1975 | Lichtenberg.................... | 104/130 |

FOREIGN PATENTS OR APPLICATIONS 707,032   6/1941   Germany..................... 104/148 MS

*Primary Examiner*—L. J. Paperner
*Assistant Examiner*—James M. Slattery
*Attorney, Agent, or Firm*—Kenyon & Kenyon Reilly Carr & Chapin

[57] ABSTRACT

In a magnetic suspension railroad where a suspension vehicle is guided by magnetic forces between a magnet on the vehicle and magnetic fields generated in track coils comprising opposing coil halves, switching contacts are arranged in the coils such that the switching contacts of the desired travel path are closed and the switching contacts of the coils of the other travel path are open.

4 Claims, 2 Drawing Figures

SWITCH FOR MAGNETIC SUSPENSION RAILROAD

BACKGROUND OF THE INVENTION

This invention relates to magnetic suspension railroads in general and more particularly to an improved switch in such a suspension railroad.

In German Pat. No. 707,032 an electromagnetic suspension railroad in which electromagnets are arranged along both longitudinal sides of the vehicle is described. These electromagnets cooperate with steel rails forming reaction bodies on both outer sides of the vehicle. Through selective operation of the electromagnets on one or the other longitudinal side of the vehicle, the vehicle is caused, at a switch, to either follow the straight path or to switch off onto a branch track. As a result, a switch which is controlled entirely electrically and requires no mechanical moving parts is obtained. However, since the attraction forces between an electromagnet and a steel rail are utilized for guiding the vehicle along the proper path, a control device must be installed in order to maintain a predetermined distance between the electromagnets and the steel rail. Control devices of this nature are costly. Thus, the need for simpler switching arrangement in which distance control is not necessary becomes evident.

SUMMARY OF THE INVENTION

The present invention provides a solution to this problem. This is accomplished by using as guidance means a centrally located vehicle coil which cooperates with a reaction rail on the roadbed which is in the form of conductor loops, with the conductor loops closed by means of disconnect switches. In accordance with the present invention, loops of this nature are installed along the straight track and along the branch path. The loops along the path that is to be followed are closed and those along the path not to be followed opened. Since this operation takes place in the reaction rails which carry only induced currents, the switching can take place without a power interruption, i.e., the electromagnets arranged on the vehicle are not switched. This permits shorter switching times and will result in the maintenance of a travel path even should a switch fail.

DETAILED DESCRIPTION OF THE PREFERRED EMBODIMENT

Figure 1:
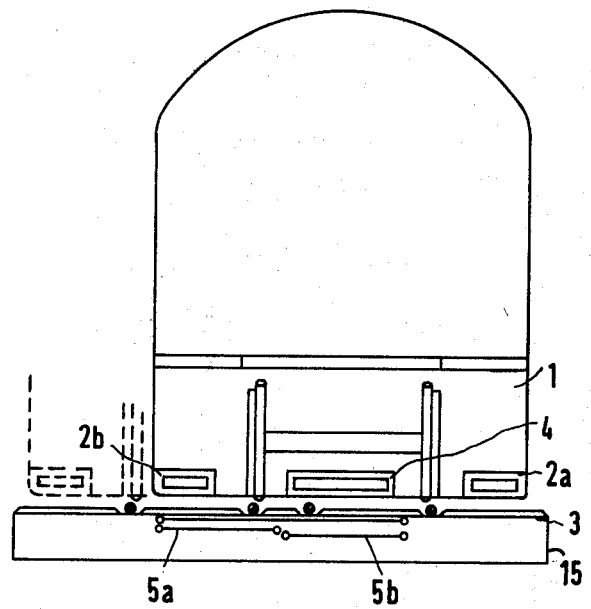
FIG. 1 is a cross-sectional schematic view of a switching system according to the present invention.

FIG. 1 illustrates a cross-sectional view of a magnetic suspension vehicle 1 suspended above a roadbed 15. For purposes of suspension, electromagnets 2a and 2b respectively, are arranged along both sides of the suspension vehicle 1. These electromagnets cooperate with reaction rails 3 on the roadbed to maintain suspension of the vehicle. Typically the system will be what is referred to as a normal flux system in which the reaction rails 3 are of a conductive but non-magnetic material. The coils 2a and 2b, which will preferably be superconducting coils, induce eddy currents in the reaction rails 3 to thereby generate an opposing magnetic force to maintain the vehicle suspended. Systems of this nature require no control means and are thus particularly advantageous. For purposes of lateral guidance of the vehicle there is installed in the center of the vehicle an additional superconducting coil 4. Coil 4 cooperates with conductor loops 5a and 5b on the roadbed to control latteral positioning. The conductor loops 5a and 5b are formed by two coils halves connected in opposition. This type of system and its manner of operation is shown in U.S. Pat. No. 3,470,828, particularly FIG. 7. In such a system, when the superconducting coil 4 on the vehicle 1 is exactly centered above the conductor loops 5a or 5b, the voltages generated in the two coil halves are equal and opposed. However, a deflection from the axis of symmetry results in unequal voltages in the two coil halves causing a resultant current to flow and corresponding restoring force to be produced.

Figure 2:
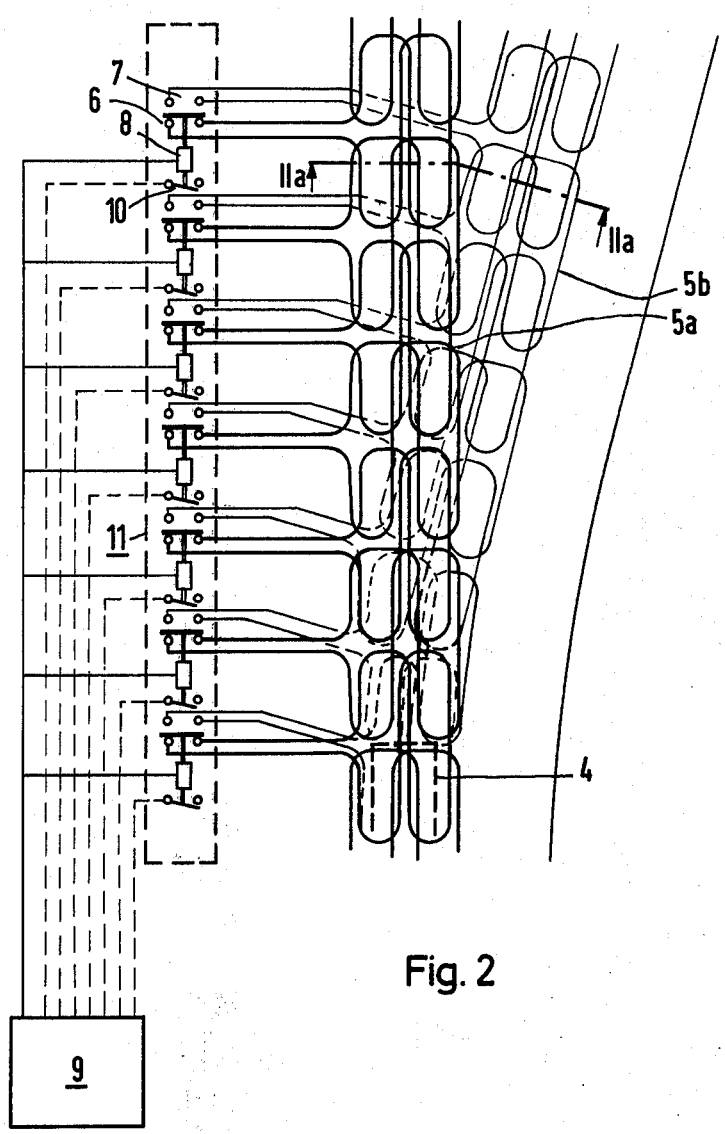
FIG. 2 is a plan view of the system of FIG. 1.

In accordance with the present invention and as illustrated by FIG. 2, two sets of coils 5a and 5b are installed on the roadbed. The coils 5a are along the straight direction of travel and the coils 5b along the branch track. In the position shown on FIG. 1, the vehicle 1 is following the branch direction and is centered over the coils 5b. Furthermore, in accordance with the present invention, the direction of travel is selected by selectively opening and closing the conductor loops 5a and 5b. When straight travel is desired, the loops 5a are closed using disconnect switches 6. For travel on the branch track the coils 5b are closed by means of the switches 7. As illustrated, the switches 6 and 7 are interlocked, forming essentially a single switch actuated by a common actuating coil 8. As illustrated it is preferable that each said of switching contacts have associated therewith an auxiliary signaling contact 10 to provide an indication of switch position. The actuating coils 8 are all controlled from a common switching station 9 which is also provided with feedback from the switches 10 to give an indication of proper switch operation so that the switch may be cleared for vehicle entry. With the arrangement shown, only the coils whose associated switch 6 or 7 is closed will form closed loops. Thus, only these closed loops will cooperate with the superconducting magnet 4 on the vehicle. As a result the vehicle will follow whichever path is controlling at the time depending upon the switches 6 and 7. Since the only current flowing in these loops are induced currents, switching is not a switching of power and thus can be carried out simply and efficiently. In order to obtain short conductor connections, it is of advantage to dispose the switches 6 and 7 between the two tracks, i.e., between the straight track and the branch track. This has not been so illustrated on the figure for sake of clarity.

Furthermore, if short line connections are not necessary, the conductor loops 5a and 5b, whose distance is greater than the length of the superconducting windings 4 on the vehicle, can be operated by a common disconnect switch thereby keeping the number of switches small.

In addition to the mechanical types of switches shown on the figure, electronic devices such as thyristors may also be used as switches. These and other modifications may be made without departing from the spirit of the invention which is intended solely by appended claims.

We claim:

1. In a magnetic suspension railroad in which a magnetic suspension vehicle is guided by means of magnetic forces between a magnet installed in the vehicle and reaction means arranged on the track, means for setting the direction of the vehicle at a switch comprising:
  a. a guidance coil located centrally on the vehicle;
  b. a first plurality of conductor loops arranged for cooperation with said centrally located guidance coil following the straight path of travel;
  c. a second plurality of conductor loops arranged for cooperation with said centrally located guidance coil for following a branch path; and
  d. at least one disconnect switch associated with said first and second plurality of conductor loops for selectively closing one plurality of loops and opening the other plurality of loops whereby the vehicle will follow the path containing the closed loops said loops when closed being closed on themselves whereby the only currents flowing in said loops will be currents induced by said guidance coil on said vehicle.

2. Apparatus according to claim 1 wherein a switch is provided for each conductor loop in each of said first and second plurality of conductor loops.

3. Apparatus according to claim 1 wherein said switches for said first and second plurality of coils comprise a switches having a common actuator coils.

4. A switch according to claim 3 wherein said disconnect switches are arranged symmetrically between the two travel paths.

* * * * *